Feb. 24, 1953  A. F. JOHNSON  2,629,135
METHOD OF CONCRETE CONSTRUCTION
Filed Nov. 23, 1948  2 SHEETS—SHEET 1

INVENTOR.
Arthur F. Johnson
BY
Pennie, Edmonds, Morton & Barrows
ATTORNEYS

Feb. 24, 1953   A. F. JOHNSON   2,629,135
METHOD OF CONCRETE CONSTRUCTION
Filed Nov. 23, 1948   2 SHEETS—SHEET 2

INVENTOR.
Arthur F. Johnson
BY
Pennie, Edmonds, Morton & Barrows
ATTORNEYS

Patented Feb. 24, 1953

2,629,135

UNITED STATES PATENT OFFICE 2,629,135

METHOD OF CONCRETE CONSTRUCTION

Arthur F. Johnson, Boulder, Colo.

Application November 23, 1948, Serial No. 61,715

3 Claims. (Cl. 18—60)

This invention relates to methods of making building blocks and like structures, especially to blocks having an exterior surface resembling natural stone, and has for its object the provision of improved structures of this character and an improved method of producing them.

Any suitable building structure formed of hydraulic cement, especially Portland cement, having a flat face for the stone-like exterior, such as slabs, bricks or blocks of cement or concrete may be used. The ordinary building block with cavities for lightness and formed of a porous concrete are advantageously used in my invention and I shall describe my invention with reference to concrete blocks as a preferred concrete structure.

The material forming the stone-like exterior is a concrete mixture including sand, white cement and coloring matter and is placed in molds shaped to give to the concrete the shape of building stones. The stone-like bodies of concrete are bonded to the concrete block with a layer of concrete formed of ordinary Portland cement and sand, preferably a layer of such concrete made dense and waterproof. This layer performs the dual function of waterproofing the exterior of the block and delineating the superimposed stone-like bodies of concrete applied to the exterior face.

In accordance with a method of my invention, I provide a mold having one or more cavities for receiving the concrete for the stone-like bodies. Where several spaced bodies are to be applied to the concrete block, the cavities are separated from each other leaving intervening spaces. The bonding layer of concrete is applied over the bodies filling the intervening spaces, thereby delineating the spaces between the bodies as by an expert artisan. The building block is placed upon the layer of concrete and bonded thereto. After the block has been removed from the mold, the stone-like areas may be sprinkled with suitable colored fine sand which adheres to the fresh cement on the surface, thereby improving the stone-like appearance.

In one of its aspects, I provide an improved method of removing the fresh concrete from the mold. A suitable kind of paper is placed over the mold and the concrete is poured over the paper. The mold is constructed with internal air ducts and leaders which open into the mold under the paper. By applying compressed air, the cast concrete is pushed out of the mold and against the block as the block is withdrawn. The paper is removed at once, sand applied if desired, and the concrete is cured.

In another embodiment of my invention I bond two or more blocks of concrete together to form a composite block on which relatively large stone-like areas or bodies are formed on the exterior. To this end, I utilize the continuous layer of concrete of Portland cement and the stone-like bodies to bond the blocks together. The layer of concrete, when applied in accordance with my invention, and worked into the space between the blocks, in combination with the stone-like bodies, forms a surprisingly strong composite block with a continuous face resembling stone masonry. I may form composite concrete blocks with a continuous flat face for a wall, or a corner block formed of blocks bonded at right angles to each other.

These and other objects of the invention will be better understood after considering the following discussion taken in conjunction with the accompanying drawing, in which.

Figure 1:
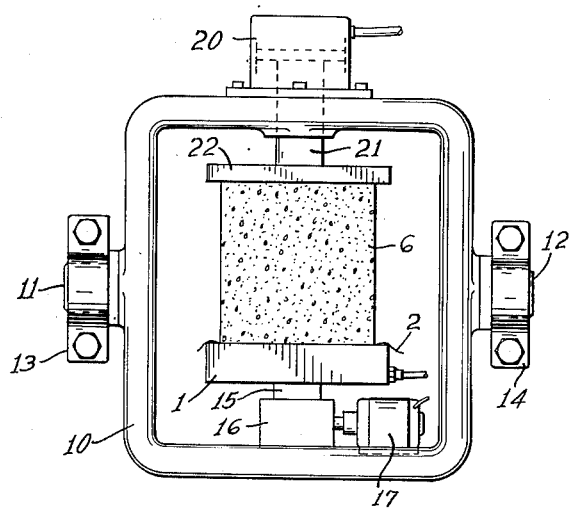
Fig. 1 is a diagrammatic illustration of an arrangement of apparatus for practicing my invention.
Figure 3:
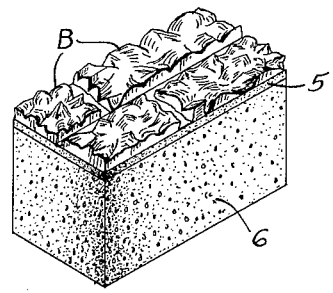
Fig. 3 is a perspective of a concrete block with several stone-like bodies bonded to the exterior.

As illustrated in the drawings, mold 1 may be made of any suitable metal, preferably cast aluminum, and comprises a plurality of disconnected irregularly shaped cavities C with surfaces shaped to give to the casting a configuration resembling natural stones. In order to facilitate removal of the stone-like bodies B formed of concrete in the cavities, a layer of paper 2 is placed over the surface of the mold. I prefer to use a long-fiber parchment paper unwaxed and similar to that used for wrapping butter which has a high wet strength. The use of this particular type of paper is a distinct advantage since it absorbs moisture from the surface of the concrete mix when it is forced into the mold and case-hardens or sets the surface. Ordinary paper is unsatisfactory because it does not have sufficient wet strength to be stripped from the face of the cast stone. Wax paper is not satisfactory because, although it retains its strength, it leaves the surface of the cast stone with unsightly pits due to entrapped water and air. These do not contribute to the appearance of the cast stone and decrease breakage resistance to freezing-thawing by perhaps three or four times.

In order to facilitate removal of the concrete from the mold, I provide the mold with an air duct 3 and a series of small holes 4 connecting the air duct with the mold cavities, the purpose of which will later be explained. The mold has a rectangular opening the size of the concrete block face, for example 8" x 16" and approximately ¼" in depth above the cavities, to receive the layer of concrete formed of Portland cement 5 by means of which the stone-like bodies of concrete are bonded to the concrete building block 6.

The following are examples of suitable concrete mixes for forming the stone-like bodies and in amounts sufficient to cover the faces of 1200 8" x 16" building blocks.

*Concrete mix for light red stone-like bodies*

500 pounds white cement.
30 pounds diatomaceous earth.
40 ounces "Ricketson's" No. 2 yellow (yellow ochre).
120 ounces "Ricketson's" No. 8 red (red oxide of iron).
1500 pounds sand (clean, washed and less than 5% —100 mesh).
180 pounds water.
20 pounds "Anti-Hydro" waterproofing compound (colloidal resin).

*Concrete mix for dark red stone-like bodies*

500 pounds white cement.
30 pounds diatomaceous earth.
80 ounces "Ricketson's" No. 2 yellow.
240 ounces "Ricketson's" No. 8 red.
1500 pounds sand (clean, washed and less than 5% —100 mesh).
180 pounds water.
20 pounds "Anti-Hydro" waterproofing compound.

I may use in the foregoing mixes various kinds of sand or crushed stone or other coloring matter for the purpose of simulating any desired kind of stone.

I may use harmoniously colored bodies on the same block; for example, bodies of light red and dark red may be used to break the monotonous uniformity and obtain a close approximation to stone.

To give greater plasticity to the stone veneer mixes as well as to the Portland cement mixes, I prefer to use from 2% to 6% or more of finely ground silica or diatomaceous earth based on the weight of cement quantity of the admixture. Some types of coal or coke furnace fly-ash are also satisfactory. This type of addition agent prevents the migration of the cement to outer surfaces of the form during the pressure and vibration necessary to compact the relatively dry mixes in the mold. Additions as low as 2% make distinct improvements in the sharpness of the cast stone impression, and improvements usually continue by additions up to 6%. In some localities where such admixtures in satisfactory form are cheap, additions up to 40% of the weight of the cement may be used with actual improvement rather than detriment to strength of the product.

The water-cement ratio is important and should be kept from 0.37 to 0.43 by weight.

The cement, color and diatomaceous earth are preferably milled together in a pebble mill before addition to the sand aggregate. Mixing with the sand aggregate is maintained for at least five minutes, both before and after the addition of the water.

*Concrete mix of Portland cement for bonding layer*

1500 pounds Portland cement.
90 pounds diatomaceous earth.
4500 pounds sand (clean, washed and less than 5% —100 mesh).
540 pounds water.
60 pounds "Anti-Hydro" waterproofing compound.

Figure 2:
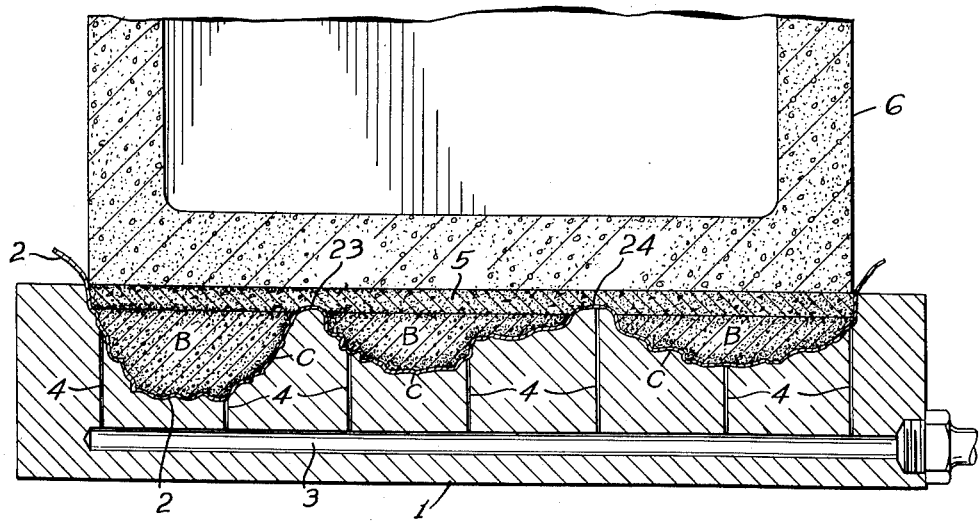
Fig. 2 is a vertical sectional view through a mold and concrete building block illustrating the application of two layers of concrete to the block in accordance with my invention.

Fig. 1 illustrates diagrammatically an arrangement of apparatus suitable for use in carrying out a method of my invention comprising a frame 10 having shafts 11 and 12 mounted in the bearings 13 and 14 so that the entire frame may be rotated. As illustrated, the mold 1 is attached to a piston 15 which is reciprocable in the cylinder 16. By means of an electric vibrator 17, such as a Syntron, the mold may be vibrated at 3600 vibrations per minute. Other suitable vibrators such as pneumatic pistons may be used. In the position shown in the drawing, the mold 1 faces upwardly to receive the concrete layers and the building block 6 as shown in Fig. 2. The pneumatic or hydraulic cylinder 20 attached to the frame has a piston 21 to which is attached a plate 22 for engaging the concrete block.

In carrying out a method of my invention in the apparatus illustrated in Fig. 1, the layer of paper 2 is placed over the inner surface of the mold and the concrete for the stone-like bodies B is placed in the cavities C in an amount such as to leave the intervening portions of the mold 23 and 24 extending above the level of the concrete in the cavities and the mold is vibrated. I compress these bodies of concrete under pressures ranging from 5 to 20 pounds or more per square inch of mold surface depending upon the consistency of the mix used. The layer of concrete 5 is then applied and it will be apparent that the projections 23 and 24 in the mold bottom form grooves in the layer of concrete 5, thus delineating the stone-like bodies. The concrete block 6 is placed over the layer of concrete 5 and the piston 21 is forced downward causing the plate 22 to press the block 6 into contact with the layer of concrete 5. In order to prevent an undue absorption of water by the concrete block, the surface may be wet prior to contacting the concrete. The vibrator 17 is set in operation and the piston 21 applies pressure against the block 6.

The time of application of pressure and vibration may be from a few seconds to a minute or more. Vibration should not be conducted sufficiently long to cause appreciable migration of the cement to the surface of the mold, but only long enough to fill all portions of the mold perfectly. After the mold and block have been rotated 180° so that the mold is above the block, vibration and pressure should be continued a few seconds.

While the block 6 is still held in pressed contact with the fresh concrete, air under pressure is admitted into the duct 3 from which it passes through the small holes 4 and into the space between the paper and the mold. The pressure on the piston 21 is released simultaneously with the application of pressure to the mold and the effect is to push the fresh concrete out of the mold and against the block as the latter is withdrawn. The air prevents the paper from sticking in the mold and pulling the concrete loose from the block as it is moved away from the mold.

After the block has been removed from the mold, I remove the paper at once and may apply to the surface of the stone-like bodies suitable colored fine sand. I have found that sand sprinkled on the surface at this time adheres to the surface due to the presence there of cement. I have tested many different mesh sizes of sand and find that the one size giving the best appearance is that −65+150 mesh. If the sand is coarser than this, the grain size is noticeably large and unnatural; if finer, the surface of the cast stone has a muddy appearance. While I prefer to use natural stone for sprinkling on the surface, it is also possible to obtain pleasing effects by coloring the natural stone with mineral pigments after it has been ground and carefully classified to the above-mentioned mesh size.

The blocks with their applied concrete are preferably cured by storing them for 16 hours in a steam room where the air is kept saturated with water vapor at a temperature of at least 180° F. for at least eight hours of the heating and cooling cycle. Instead of the storage room curing, the blocks may be suitably cured by keeping them in a continually moist condition above 60° F. for one week.

Figure 4:
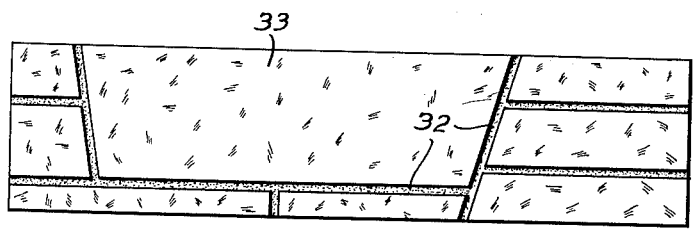
Fig. 4 is a front elevation of a composite block of the invention.
Figure 5:
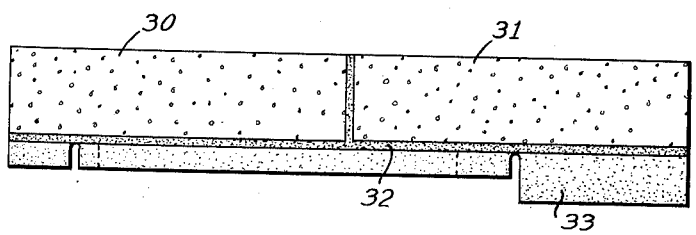
Fig. 5 is a plan view of the composite block of Fig. 4.

In that adaptation of my invention illustrated in Figs. 4 and 5, two blocks of porous concrete 30 and 31, for example each 4" x 8" x 16", are placed in a mold, as in Fig. 1, with the distance ⅜" therebetween. The two layers of concrete, namely the one formed of Portland cement 32 and the one formed of white cement 33, are placed in the mold and the bonding effected by pressure and vibration as previously described. Concrete formed of the Portland cement may be placed in the space between the blocks or permitted to work up in the space due to the vibration and pressure.

It is advantageous also to align the two blocks and fill the space between the ends and cure them for, say, 24 hours, before putting them in the mold. This insures perfect alignment and facilitates application of the concrete 32 and 33. It will be apparent that when large composite blocks, such as that of Figs. 4 and 5, are erected in a wall that the work of concealing the mortar joints between the blocks is considerably minimized. When required to form a large wall area resembling stone construction, the mortar joints are pointed up with a concrete mix identical in color to that used to form the bonding and delineating layer.

While I prefer to use ordinary Portland cement in the bonding and delineating layer since it is most economical, pleasing effects can also be obtained by using uncolored white cement or other cementing materials colored black or any color to suitably match or contrast with the stone-like masses. In any case the material for pointing up the blocks in the wall should correspond in appearance with that used in the bonding and delineating layer.

Figure 6:
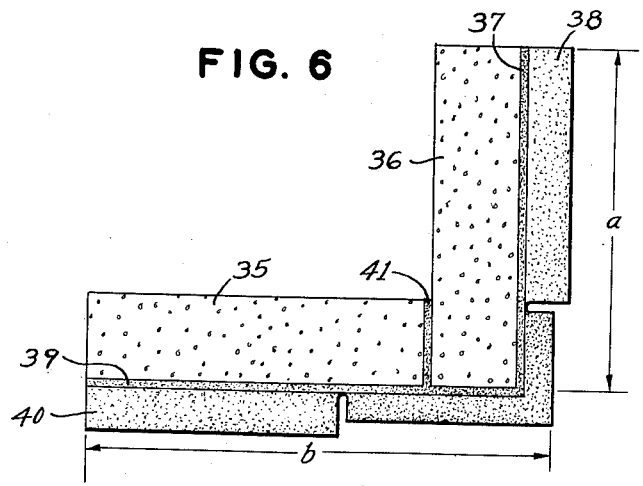
Fig. 6 is a plan view of a composite corner block of the invention.

Fig. 6 illustrates the formation of a composite corner unit of two blocks 35 and 36 each of, say, 4" x 8" x 16". In the production of this corner block, the layers of concrete 37 and 38 are first applied to the surface $a$ and the concrete is allowed to harden for around 16 hours at room temperature. Then the concrete layers 39 and 40 are applied over the surface $b$ and the composite block is steam cured at about 180° F. The space between the blocks may be filled with Portland cement concrete 41 prior to, simultaneous with, or subsequent to, the application of concrete layers 39 and 40.

My invention provides a porous concrete block having a layer of dense, preferably water-proof, concrete on the exterior face and one or more stone-like bodies of concrete bonded to the layer of concrete. By means of my construction, I achieve the production of an improved block with a minimum of cost in material and labor. The layer of concrete formed of ordinary Portland cement costs much less than the concrete bodies formed of white cement. Moreover, the Portland cement having a different color delineates the stone-like bodies, giving the effect of careful hand work by skilled artisans.

I claim:

1. The method of forming an improved concrete building block which comprises providing a mold with a plurality of cavities spaced by intervening projections and having irregular configurations for receiving the concrete to resemble stones, applying a sheet of paper over the cavities and projections, placing in the cavities over the paper concrete to form stone-like bodies in the cavities, the paper over the projections being uncovered with such concrete, placing over the concrete in the cavities and on the paper over the projections a layer of different concrete which gives a delineating contrast with the concrete of the cavities, the paper serving to prevent intermingling of the concrete of the cavities and the layer, placing a preformed concrete block over the said layer, applying pressure to the block while vibrating the mold to effect a uniformly strong bonding of the block to said layer, and while maintaining the pressure between the mold and the block turning the block and mold over to place the mold in an upward position, and removing the mold before the concrete of the layer and in the cavities has set to a firm state.

2. In the method of claim 1, forcing gas under pressure between the paper and the mold to facilitate lifting the mold from the block and severing it from the paper.

3. In the method of claim 1, after removal of the mold and paper, sprinkling ground stone particles over the fresh concrete of the stone-like bodies.

ARTHUR F. JOHNSON.

REFERENCES CITED

The following references are of record in the file of this patent:

UNITED STATES PATENTS

| Number | Name | Date |
| --- | --- | --- |
| 216,311 | Couch | June 10, 1879 |
| 719,244 | Mooney | Jan. 27, 1903 |
| 909,792 | Henderson | Jan. 12, 1909 |
| 1,162,172 | Jones | Nov. 30, 1915 |
| 1,204,378 | Spencer | Nov. 7, 1916 |
| 1,386,314 | Carrier | Aug. 2, 1921 |
| 1,411,005 | Dula | Mar. 28, 1922 |
| 1,438,506 | Spring | Dec. 12, 1922 |
| 1,571,849 | Long | Feb. 2, 1926 |
| 1,583,748 | Reuter-Lorenzen | May 4, 1926 |
| 1,592,536 | O'Neil | July 13, 1926 |
| 1,678,613 | Weiss | July 24, 1928 |
| 1,916,308 | Grieco | July 4, 1933 |
| 2,047,356 | Boyle | July 14, 1936 |
| 2,058,295 | Burbank et al. | Oct. 20, 1936 |
| 2,101,992 | Fish | Dec. 14, 1937 |
| 2,114,794 | Bratring | Apr. 19, 1938 |